(12) United States Patent
Matsumoto

(10) Patent No.: US 11,838,673 B2
(45) Date of Patent: Dec. 5, 2023

(54) VIDEO PROCESSING APPARATUS, VIDEO PROCESSING SYSTEM AND VIDEO PROCESSING METHOD

(71) Applicant: Roland Corporation, Shizuoka (JP)

(72) Inventor: Kenichi Matsumoto, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 18/087,828

(22) Filed: Dec. 23, 2022

(65) Prior Publication Data

US 2023/0209002 A1 Jun. 29, 2023

(30) Foreign Application Priority Data

Dec. 28, 2021 (JP) ................. 2021-214498

(51) Int. Cl.
*H04N 5/06* (2006.01)
*H04N 5/38* (2006.01)

(52) U.S. Cl.
CPC ............. *H04N 5/06* (2013.01); *H04N 5/38* (2013.01)

(58) Field of Classification Search
CPC ............ H04N 5/04; H04N 21/43076; H04N 21/43079; H04N 21/4307; H04N 5/38; H04N 5/06; H04N 5/08; H04N 9/475
USPC ........................ 348/500, 512, 515
See application file for complete search history.

(56) References Cited

U.S. PATENT DOCUMENTS

| 6,906,755 B2 | 6/2005 | Lundblad et al. |
| 7,268,826 B2 | 9/2007 | Lundblad et al. |
| 7,460,173 B2 | 12/2008 | Lundblad et al. |
| 2015/0077633 A1* | 3/2015 | Lee .................... H04N 21/4392 348/515 |

FOREIGN PATENT DOCUMENTS

| JP | H0282887 | 3/1990 |
| JP | 2009049919 | 3/2009 |
| JP | 4369281 | 11/2009 |
| JP | 2010074558 | 4/2010 |
| JP | 4953707 | 6/2012 |

* cited by examiner

*Primary Examiner* — Sherrie Hsia
(74) *Attorney, Agent, or Firm* — JCIPRNET

(57) ABSTRACT

A video processing apparatus is provided, including an audio acquisition part; a video reception part; a video transmission time reception part receiving, from a video output device, a video transmission time, which is a time at which the video received by the video reception part is transmitted from the video output device; a video processing part; a video processing completion time acquisition part acquiring a video processing completion time, which is a time at which processing performed by the video processing part is completed; a delay time calculation part calculating a delay time, which is a time difference between the video processing completion time and the video transmission time; a delayed audio creation part creating delayed audio obtained by delaying the audio acquired by the audio acquisition part by the delay time; and an output part outputting the video processed by the video processing part and the delayed audio.

14 Claims, 10 Drawing Sheets

VIDEO PROCESSING APPARATUS, VIDEO PROCESSING SYSTEM AND VIDEO PROCESSING METHOD

CROSS-REFERENCE TO RELATED APPLICATION

This application claims the priority benefits of Japanese application no. 2021-214498, filed on Dec. 28, 2021. The entirety of the above-mentioned patent application is hereby incorporated by reference herein and made a part of this specification.

BACKGROUND

Technical Field

The disclosure relates to a video processing apparatus, a video processing system, and a video processing method.

Description of Related Art

Patent Literature 1 describes a technique for outputting video and audio of a received MPEG-2 transport stream (hereinafter abbreviated as "stream") in synchronization. Specifically, a stream contains time information called "PTS" for synchronizing video and audio, and the time difference between the time of processing the video of the received stream and the PTS is regarded as the delay when the video is processed, and is applied to the audio. As a result, the delay between video and audio in the stream can be suppressed.

RELATED ART

Patent Literature

[Patent Literature 1] U.S. Pat. No. 7,460,173

However, according to Patent Literature 1, there is a problem that when the video and audio from a stream are mixed and output with the audio acquired by another device other than the device that created the stream, the video and audio from the stream cannot be synchronized with the audio acquired by another device, resulting in a deviation between them.

SUMMARY

The disclosure provides a video processing apparatus, a video processing system, and a video processing method capable of suppressing a deviation between video and audio.

A video processing apparatus according to an embodiment of the disclosure includes: an audio acquisition part acquiring audio from an audio input device connected; a video reception part receiving video from a video output device; a video transmission time reception part receiving, from the video output device, a video transmission time, which is a time at which the video received by the video reception part is transmitted from the video output device; a video processing part processing the video received by the video reception part; a video processing completion time acquisition part acquiring a video processing completion time, which is a time at which processing performed by the video processing part is completed; a delay time calculation part calculating a delay time, which is a time difference between the video processing completion time acquired by the video processing completion time acquisition part and the video transmission time received by the video transmission time reception part; a delayed audio creation part creating delayed audio obtained by delaying the audio acquired by the audio acquisition part by the delay time calculated by the delay time calculation part; and an output part outputting the video processed by the video processing part and the delayed audio created by the delayed audio creation part.

A video processing apparatus according to another embodiment of the disclosure includes: a video reception part receiving video from a video output device; a video transmission time reception part receiving a video transmission time from the video output device; a video processing part processing the video received by the video reception part; a video processing completion time acquisition part acquiring a video processing completion time, which is a time at which processing performed by the video processing part is completed; a delay time calculation part calculating a delay time, which is a time difference between the video processing completion time acquired by the video processing completion time acquisition part and the video transmission time received by the video transmission time reception part; a delay time transmission part transmitting the delay time calculated by the delay time calculation part to an audio processing device; an audio reception part receiving audio from the audio processing device; and an output part outputting the video processed by the video processing part and the audio received by the audio reception part.

A video processing system according to an embodiment of the disclosure includes: a video output device, a video processing apparatus, and an audio processing device. The video output device includes: an imaging part capturing video; a video transmission part transmitting the video captured by the imaging part to the video processing apparatus; a transmission time acquisition part acquiring a video transmission time, which is a time at which the video is transmitted by the video transmission part; and a video transmission time transmission part transmitting the video transmission time acquired by the transmission time acquisition part to the video processing apparatus. The video processing apparatus includes: a video reception part receiving the video from the video output device; a video transmission time reception part receiving the video transmission time from the video output device; a video processing part processing the video received by the video reception part; a video processing completion time acquisition part acquiring a video processing completion time, which is a time at which processing performed by the video processing part is completed; a delay time calculation part calculating a delay time, which is a time difference between the video processing completion time acquired by the video processing completion time acquisition part and the video transmission time received by the video transmission time reception part; a delay time transmission part transmitting the delay time calculated by the delay time calculation part to the audio processing device; a delayed audio reception part receiving delayed audio from the audio processing device; and an output part outputting the video processed by the video processing part and the delayed audio received by the delayed audio reception part. The audio processing device includes: an audio acquisition part acquiring audio from an audio input device connected; a delay time reception part receiving the delay time from the video processing apparatus; a delayed audio creation part creating the delayed audio obtained by delaying the audio acquired by the audio acquisition part by the delay time received by the delay time reception part; and a delayed audio transmission part transmitting the delayed audio created by the delayed audio creation part to the video processing apparatus.

A video processing method according to an embodiment of the disclosure includes: acquiring audio; receiving video; receiving a video transmission time, which is a time at which the video received is transmitted; processing the video received; acquiring a video processing completion time, which is a time at which processing is completed; calculating a delay time, which is a time difference between the video processing completion time acquired and the video transmission time received; creating delayed audio obtained by delaying the audio acquired by the delay time calculated; and outputting the video processed and the delayed audio created.

A video processing method according to another embodiment of the disclosure includes: receiving video; receiving a video transmission time, which is a time at which the video received is transmitted; processing the video received; acquiring a video processing completion time, which is a time at which processing is completed; calculating a delay time, which is a time difference between the video processing completion time acquired and the video transmission time received; transmitting the delay time calculated; receiving audio; and outputting the video processed and the audio received.

DESCRIPTION OF THE EMBODIMENTS

Figure 1:
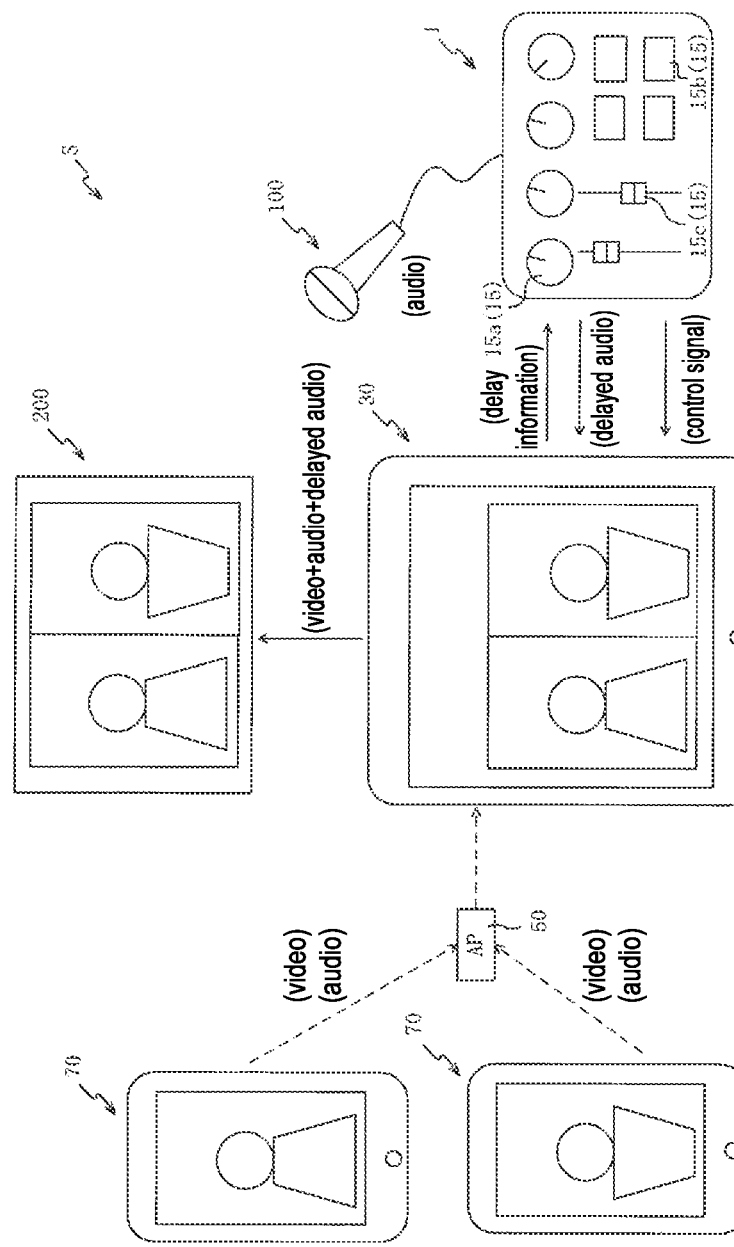
FIG. 1 is a diagram showing an overview of the video processing system.

Exemplary embodiments will be described hereinafter with reference to the accompanying drawings. An overview of a video processing system S according to this embodiment will be described with reference to FIG. 1. FIG. 1 is a diagram showing an overview of the video processing system S. As shown in FIG. 1, the video processing system S includes an audio processing device 1, a tablet terminal 30, and a plurality of mobile terminals 70.

The audio processing device 1 is a device that is connected to the tablet terminal 30 by wire, and delays the acquired audio and transmits the delayed audio to the tablet terminal 30. A microphone 100 for acquiring audio is connected to the audio processing device 1. Delayed audio, which is audio obtained by delaying the audio acquired from the microphone 100 by a delay time (which will be described later) received from the tablet terminal 30, is created, and the created delayed audio is transmitted to the tablet terminal 30.

The audio processing device 1 is provided with a setting key 15. Specifically, the setting key 15 is composed of a knob 15a which is a knob-shaped operator, a button 15b which is a button-shaped operator, and a slider 15c which is a slider-shaped operator. With the setting key 15, it is possible to adjust the volume, etc. of the input audio and set the delay time used for the delayed audio.

It is also possible to transmit a control signal corresponding to a set value to the tablet terminal 30 by the setting key 15, and operate the tablet terminal 30 according to the control signal. Thus, the tablet terminal 30 can be operated more intuitively by using the setting key 15 composed of hard keys.

The tablet terminal 30 is a video processing apparatus (computer) that synthesizes the delayed audio received from the audio processing device 1 and the video and audio received from the mobile terminal 70, and outputs the same. An external monitor 200 for outputting the synthesized video and audio is connected to the tablet terminal 30.

The tablet terminal 30 can create video and audio obtained by appropriately synthesizing and combining the video and audio respectively received from the plurality of mobile terminals 70, and select the video and audio to be output among the video and audio received from the plurality of mobile terminals 70. At this time, the control signal from the setting key 15 of the audio processing device 1 described above may be used for synthesizing and selecting the video and audio. In addition, the images, video, or audio acquired by the camera and microphone of the tablet terminal 30 and the images, video, or audio stored in the tablet terminal 30 may be synthesized with the video received from the plurality of mobile terminals 70, for example.

In this way, the delayed audio received from the audio processing device 1 is mixed with the video and audio obtained from the mobile terminals 70 and synthesized and/or selected to be output to the external monitor 200, so as to be displayed on the external monitor 200.

Nevertheless, the video and audio synthesized by the tablet terminal 30 are not necessarily output to the external monitor 200, and may be distributed to the outside via the Internet, etc. or may be stored in a recording medium, for example. In addition, the audio received from the mobile terminal 70 may not be included in the video and audio to be output. Furthermore, similarly, the video or audio received from the mobile terminal 70 may not be included in the video and audio to be output.

The mobile terminal 70 is a video output device (information processing device, computer) that is wirelessly connected to the tablet terminal 30 and acquires video and audio. The mobile terminal 70 is provided with a mobile camera 76 (see FIG. 6) for acquiring video and a mobile microphone 77 (see FIG. 6) for acquiring audio. The video acquired by the mobile camera 76 and the audio acquired by the mobile microphone 77 are respectively transmitted to the tablet terminal 30. The number of the mobile terminals 70 included in the video processing system S is not necessarily more than one, and may be one. In addition, the video and audio transmitted from the mobile camera 76 to the tablet terminal 30 are not necessarily acquired from the mobile camera 76 and the mobile microphone 77, and may be the video and audio stored in the mobile terminal 70 or the video and audio of a game being played on the mobile terminal 70, for example.

The mobile terminal 70 and the tablet terminal 30 are connected by wireless communication (for example, Wi-Fi (registered trademark)). Further, a plurality of mobile terminals 70 are connected to one wireless communication access point 50 (hereinafter abbreviated as "AP 50"). When a plurality of mobile terminals 70 are connected to one AP 50 to simultaneously acquire video and audio and transmit the same to the tablet terminal 30, it is still possible to suppress a deviation (delay) due to communication between the acquired video and audio. Nevertheless, the plurality of mobile terminals 70 are not necessarily connected to one AP 50, and may be connected to a plurality of different AP 50.

As described above, in the tablet terminal 30, the video and audio received by the mobile terminal 70 and the audio received from the audio processing device 1 are synthesized and output. In general, processing such as acquisition of video and synthesis for video takes more time than processing such as acquisition of audio and synthesis for audio. Therefore, when the video from the mobile terminal 70 and the audio received from the audio processing device 1 are synthesized in the tablet terminal 30, the video from the mobile terminal 70 is delayed more than the audio received from the audio processing device 1.

For example, when the video of a person playing a guitar is acquired by the mobile terminal 70 and a performance sound being played by the person is acquired by the audio processing device 1, a so-called "sound lag" may occur in which the guitar sound acquired by the audio processing device 1 is output before the video of the person playing the guitar. Therefore, in this embodiment, in the audio processing device 1, the audio acquired by the microphone 100 is delayed according to the delay time set from the tablet terminal 30. Accordingly, it is possible to suppress the deviation between the video and audio received by the mobile terminal 70 and the audio received from the audio processing device 1.

Furthermore, as methods for setting the delay time, a full-auto mode and a semi-auto mode are provided. The full-auto mode is a method of setting the delay time each time according to the time at which video is transmitted from the mobile terminal 70 or the time at which video is processed. The semi-auto mode is to generate a specific sound (specifically, a handclap sound) and set the delay time based on the timing at which the sound is observed by the audio processing device 1 and the mobile terminal 70. The delay times in the full-auto mode and the semi-auto mode will be described with reference to FIG. 2A, FIG. 2B, and FIG. 3.

Figure 2A:
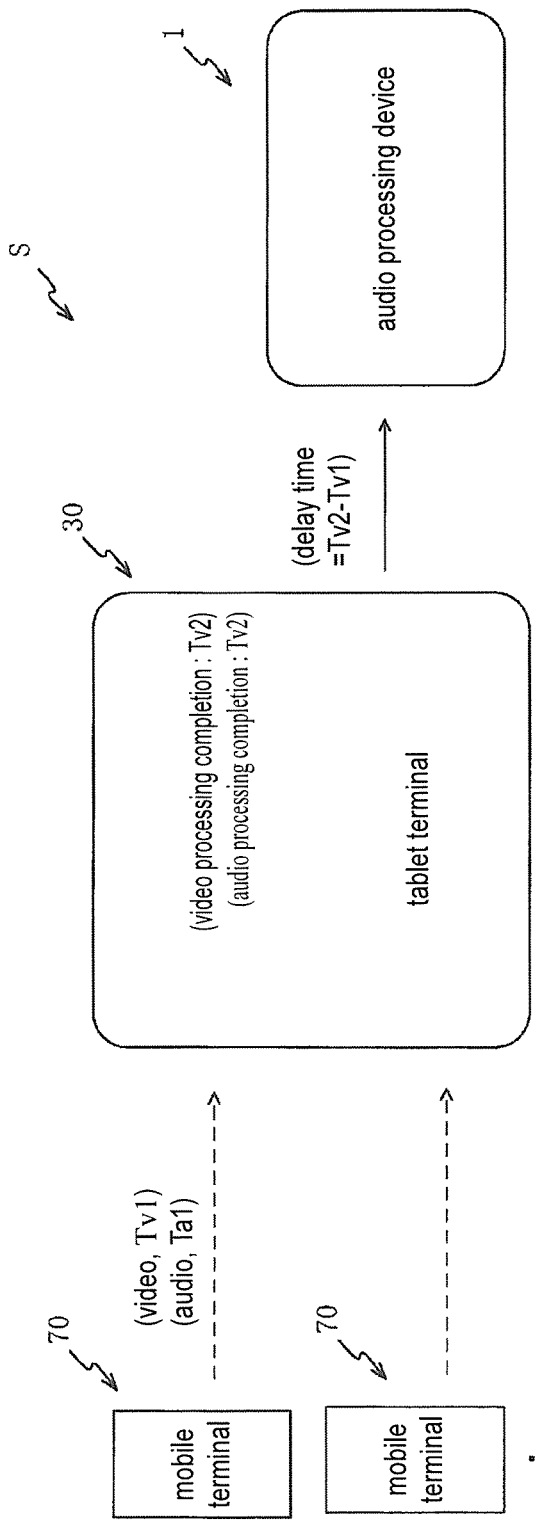
FIG. 2A is a diagram illustrating a setting of the delay time in the full-auto mode.
Figure 2B:
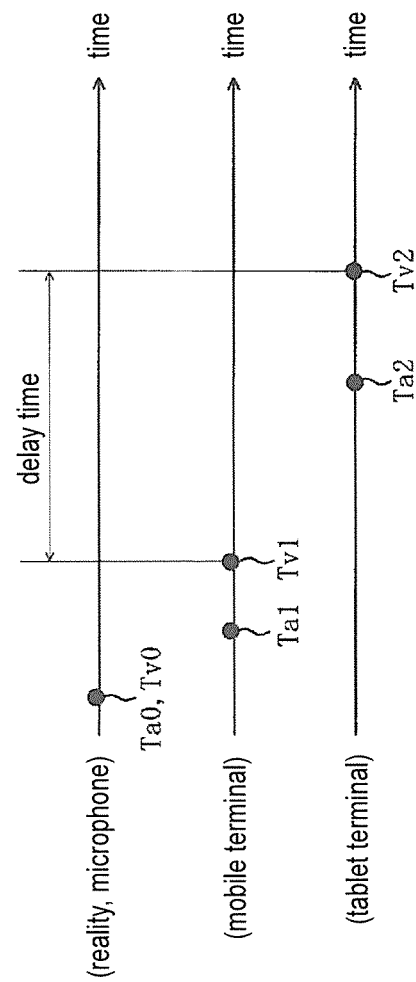
FIG. 2B is a diagram showing timings of the microphone, the mobile terminal, and the tablet terminal in the full-auto mode.

First, the full-auto mode will be illustrated. FIG. 2A is a diagram illustrating a setting of the delay time in the full-auto mode, and FIG. 2B is a diagram showing timings of the microphone 100, the mobile terminal 70, and the tablet terminal 30 in the full-auto mode. Regarding the delay time in the full-auto mode, the delay time is set based on the time at which the video is acquired by the mobile terminal 70, and the time at which arbitrary processing of the tablet terminal 30 related to the video is completed (for example, the time at which reception of video is completed, and/or the time at which synthesis of video is completed).

When the mobile terminal 70 is connected to the tablet terminal 30, the tablet terminal 30 transmits a time reset instruction for resetting (for example, 00:00) the time of a timekeeping part such as a timer built in each of the plurality of mobile terminals 70. The tablet terminal 30 transmitting the time reset instruction and the mobile terminals 70 receiving the time reset instruction reset the times of their respective timekeeping parts.

The timing at which the audio processing device 1 and the mobile microphone 77 of the mobile terminal 70 actually acquire the audio is set to Ta0, and the timing at which the mobile camera 76 of the mobile terminal 70 actually acquires the video is set to Tv0. The Ta0 and Tv1 are the same timing.

The mobile microphone 77 of the mobile terminal 70 acquires the audio at Ta0, and necessary processing is performed in the mobile terminal 70, and then the time of transmitting the audio to the tablet terminal 30 is Ta1. This timing Ta1 is referred to as "audio transmission time." Similarly, the mobile camera 76 of the mobile terminal 70 acquires the video at Ta0, and necessary processing is performed in the mobile terminal 70, and then the time of transmitting the video to the tablet terminal 30 is Tv1. This timing Tv1 is referred to as "video transmission time."

Since these timings Ta1 and Tv1 come after the processing of the mobile terminal 70 is applied, the timings Ta1 and Tv1 are later than the timings Ta0 and Tv0, respectively. Furthermore, since the processing load of the mobile terminal 70 is higher in the processing of video than in the processing of audio, the video transmission time Tv1 is later than the audio transmission time Ta1. Such an audio transmission time Ta1 is transmitted to the tablet terminal 30 together with the corresponding audio, and the video transmission time Tv1 is also transmitted to the tablet terminal 30 together with the corresponding video.

The tablet terminal 30 performs processing such as synthesis of the audio and video received from the mobile terminal 70. The time at which the processing of audio is completed in such processing is Ta2, and this timing Ta2 is referred to as "audio processing completion time." In addition, the time at which the arbitrary processing of video described above is completed in such processing is Tv2, and this timing Tv2 is referred to as "video processing completion time." Similar to the mobile terminal 70, since the processing load is higher in the processing of video than in the processing of audio, the video processing completion time Tv2 is later than the video transmission time Ta2.

The tablet terminal 30 calculates the difference between the video processing completion time Tv2 and the video transmission time Tv1 as a delay time, and transmits the delay time to the audio processing device 1. In the audio processing device 1, delayed audio is created by delaying the audio acquired from the microphone 100 by the received delay time, and transmitted to the tablet terminal 30.

Here, the timings Ta0 and Tv0 at which the mobile terminal 70 actually acquires the video and audio cannot be accurately timed by the mobile terminal 70 for the video and audio are not established as information. On the other hand, since the video transmission time Tv1 is established as video and is after subsequent processing is applied, the timing thereof can be accurately timed.

As described above, in the full-auto mode, the delay time is calculated based on the difference between the video transmission time Tv1, which is the fastest timing that can be timed for video, and the video processing completion time Tv2, which is the latest timing for video immediately before the processing such as synthesis is completed in the tablet terminal 30 and output to the external monitor 200. Thus, the timing of the audio acquired in the audio processing device 1 can be further delayed until the timing at which the video is acquired by the mobile terminal 70, and therefore it is possible to further suppress the deviation between the audio acquired by the audio processing device 1 and the video acquired by the mobile terminal 70.

Further, the mobile terminal 70 that transmits the audio transmission time Ta1 and the video transmission time Tv1 in this way is only one mobile terminal 70 selected in advance among the plurality of mobile terminals 70. In this embodiment, as a method for selecting one mobile terminal 70 among the plurality of mobile terminals 70, the mobile terminal 70 with an identifier having the lowest value, among integer identifiers uniquely assigned to the plurality of mobile terminals 70 during connection, is selected.

Accordingly, it is not necessary for the user H who operates the tablet terminal 30 to select one mobile terminal 70 for which the delay time is to be calculated among the plurality of mobile terminals 70 each time. Besides, since it is not necessary to calculate the delay time for each of the plurality of mobile terminals 70 in the tablet terminal 30, the processing load of the tablet terminal 30 can be reduced.

Figure 3:
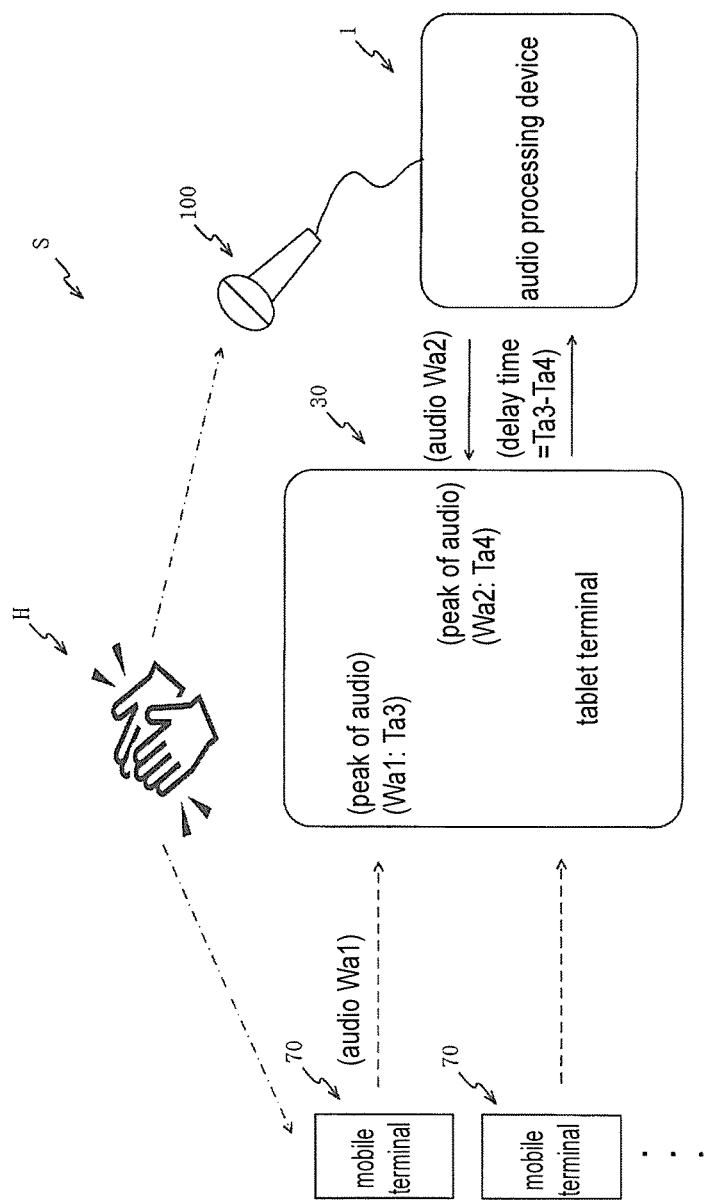
FIG. 3 is a diagram illustrating a setting of the delay time in the semi-auto mode.

Next, the semi-auto mode will be described with reference to FIG. 3. FIG. 3 is a diagram illustrating a setting of the delay time in the semi-auto mode. In the semi-auto mode, the delay time is set based on the timing at which a specific sound is observed by the microphone 100 of the audio processing device 1 and the mobile microphone 77 of the mobile terminal 70.

Specifically, the specific sound, for example, the sound of the user H clapping as shown in FIG. 3 (hereinafter referred to as "handclap sound"), is simultaneously observed by the mobile microphone 77 of the mobile terminal 70 and the microphone 100 of the audio processing device 1, and audio Wa1, which is the waveform data of the audio observed by the mobile microphone 77 of the mobile terminal 70 and audio Wa2, which is the waveform data of the audio observed by the microphone 100 of the audio processing device 1 at that time are transmitted to the tablet terminal 30. The mobile terminal 70 that transmits the audio Wa1 is the mobile terminal 70 with the identifier having the lowest value, among the plurality of mobile terminals 70, as in the full-auto mode described above.

In the tablet terminal 30, the time at which the audio Wa1 reaches the peak, that is, the time at which the handclap sound is observed, is a peak time Ta3, and similarly, the time at which the audio Wa2 reaches the peak is a peak time Ta4. Then, the time difference between the peak time Ta3 and the peak time Ta4 is transmitted to the audio processing device 1 as the delay time.

In the semi-auto mode, the delay time is set based on the peak of one specific sound simultaneously observed by the mobile terminal 70 and the audio processing device 1. Accordingly, the deviation between the sound acquired by the audio processing device 1 and the sound acquired by the mobile terminal 70 can be more preferably suppressed. Further, based on the peak observed by the mobile terminal 70 and the audio processing device 1, it is possible to easily acquire the deviation therebetween and calculate the delay time.

Figure 4:
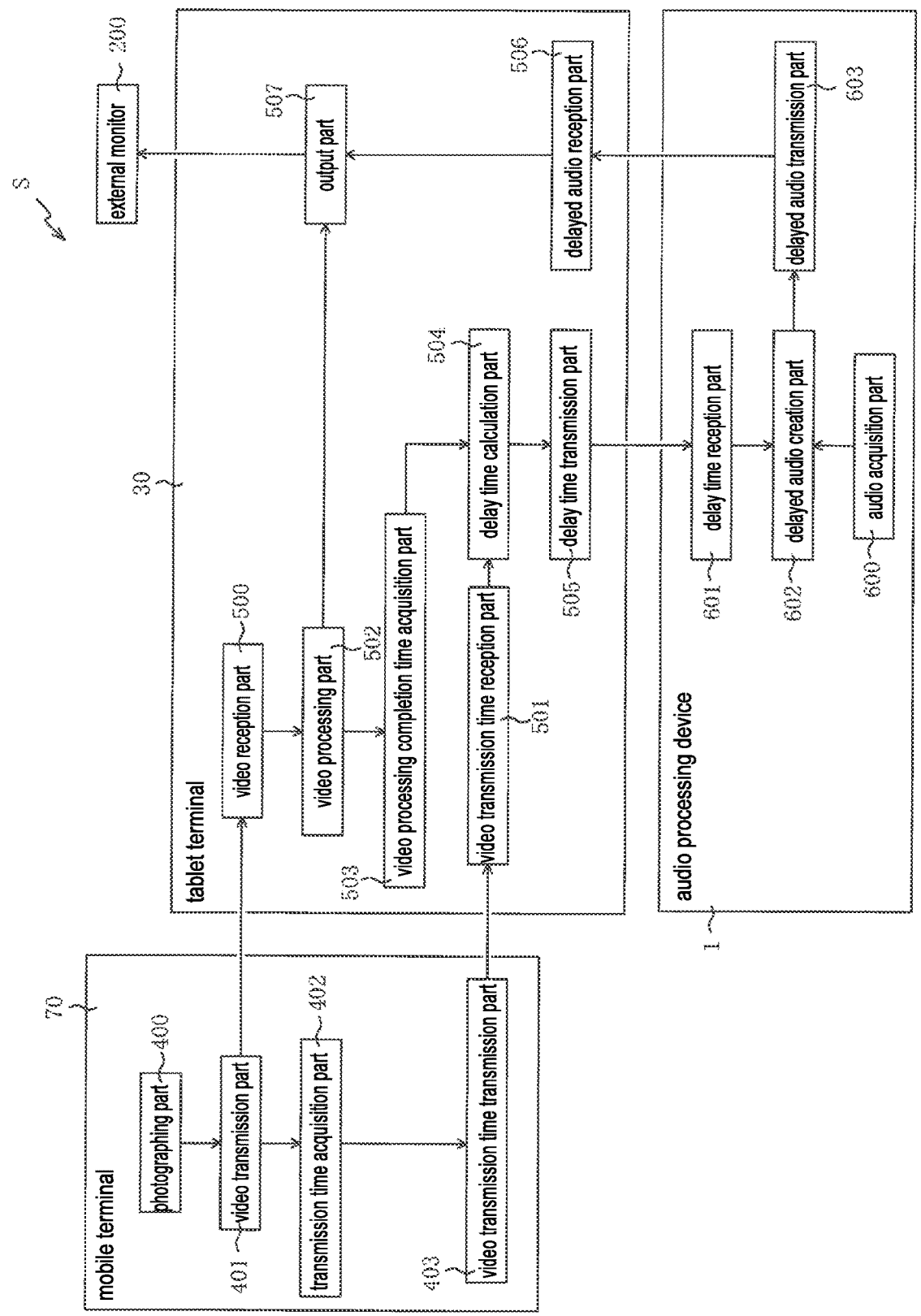
FIG. 4 is a functional block diagram of the video processing system.

Next, the functions of the video processing system S will be described with reference to FIG. 4. FIG. 4 is a functional block diagram of the video processing system S. As shown in FIG. 4, the mobile terminal 70 has an imaging part 400, a video transmission part 401, a transmission time acquisition part 402, and a video transmission time transmission part 403.

The imaging part 400 is a part for capturing video, and is realized by the mobile camera 76. The video transmission part 401 is a part for transmitting the video captured by the imaging part 400 to the tablet terminal 30, and is realized by a CPU 71 and a wireless communication device 78 which will be described later with reference to FIG. 6. The transmission time acquisition part 402 is a part for acquiring the video transmission time, which is the time at which the video is transmitted by the video transmission part 401, and is realized by the CPU 71. The video transmission time transmission part 403 is a part for transmitting the video transmission time acquired by the transmission time acquisition part 402 to the tablet terminal 30, and is realized by the CPU 71 and the wireless communication device 78.

The tablet terminal 30 has a video reception part 500, a video transmission time reception part 501, a video processing part 502, a video processing completion time acquisition part 503, a delay time calculation part 504, a delay time transmission part 505, a delayed audio reception part 506, and an output part 507.

Figure 5:
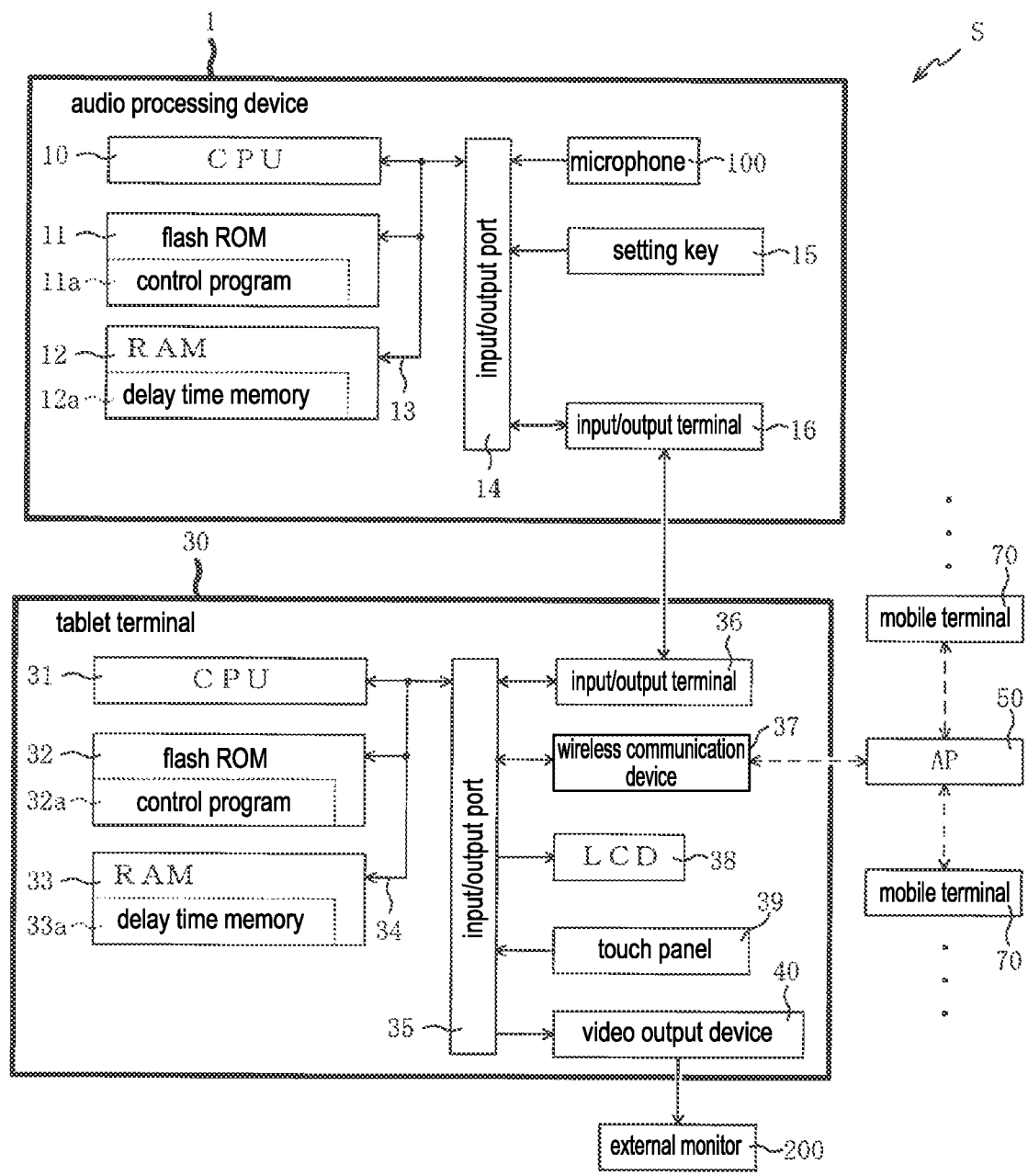
FIG. 5 is a block diagram showing electrical configurations of the audio processing device and the tablet terminal in the video processing system.

The video reception part 500 is a part for receiving video from the mobile terminal 70, and is realized by a CPU 31 and a wireless communication device 37 which will be described later with reference to FIG. 5. The video transmission time reception part 501 is a part for receiving the video transmission time from the mobile terminal 70, and is realized by the CPU 31 and the wireless communication device 37. The video processing part 502 is a part for processing the video received by the video reception part 500, and is realized by the CPU 31. The video processing completion time acquisition part 503 is a part for acquiring the video processing completion time, which is the time at which the processing performed by the video processing part 502 is completed, and is realized by the CPU 31. The delay time calculation part 504 is a part for calculating the delay time, which is the time difference between the time acquired by the video processing completion time acquisition part 503 and the video transmission time received by the video transmission time reception part 501, and is realized by the CPU 31.

The delay time transmission part 505 is a part for transmitting the delay time calculated by the delay time calculation part 504 to the audio processing device 1, and is realized by the CPU 31 and an input/output terminal 36 which will be described later with reference to FIG. 5. The delayed audio reception part 506 receives the delayed audio from the audio processing device 1, and is realized by the CPU 31 and the input/output terminal 36. The output part 507 is a part for outputting the video processed by the video processing part 502 and the delayed audio received by the delayed audio reception part 506, and is realized by the CPU 31.

The audio processing device 1 has an audio acquisition part 600, a delay time reception part 601, a delayed audio creation part 602, and a delayed audio transmission part 603. The audio acquisition part 600 is a part for acquiring the audio from the connected microphone 100, and is realized by a CPU 10 which will be described later with reference to FIG. 5. The delay time reception part 601 is a part for receiving the delay time from the tablet terminal 30, and is realized by the CPU 10 and an input/output terminal 16 which will be described later with reference to FIG. 5. The delayed audio creation part 602 is a part for creating the delayed audio obtained by delaying the audio acquired by the audio acquisition part 600 by the delay time received by the delay time reception part 601, and is realized by the CPU 10. The delayed audio transmission part 603 is a part for transmitting the delayed audio created by the delayed audio creation part 602 to the tablet terminal 30, and is realized by the CPU 10 and the input/output terminal 16.

In the video processing system S, the tablet terminal 30 receives the video and the video transmission time of the video from the mobile terminal 70, and acquires the video processing completion time at which the processing of the received video is completed. Then, the delay time, which is the time difference between the video processing completion time and the video transmission time, is calculated and transmitted to the audio processing device 1. The delayed audio obtained by delaying the audio acquired by the audio processing device 1 by the delay time is created and transmitted to the tablet terminal 30. The video processed in the tablet terminal 30 and the delayed audio are synthesized and output. Thus, when the video of one object received from the mobile terminal 70 and the audio emitted by the one object acquired by the audio processing device 1 are synthesized, it is still possible to suppress the deviation between the video and the audio, and suppress the viewer's sense of incongruity when viewing the video and the audio.

Next, an electrical configuration of the video processing system S will be described with reference to FIG. 5 and FIG. 6. FIG. 5 is a block diagram showing electrical configurations of the audio processing device 1 and the tablet terminal 30 in the video processing system S. The audio processing device 1 has the CPU 10, a flash ROM 11, and a RAM 12, which are connected to an input/output port 14 via a bus line 13, respectively. The input/output port 14 is further connected with the setting key 15 and the microphone 100 described above, and the input/output terminal 16.

Figure 10:
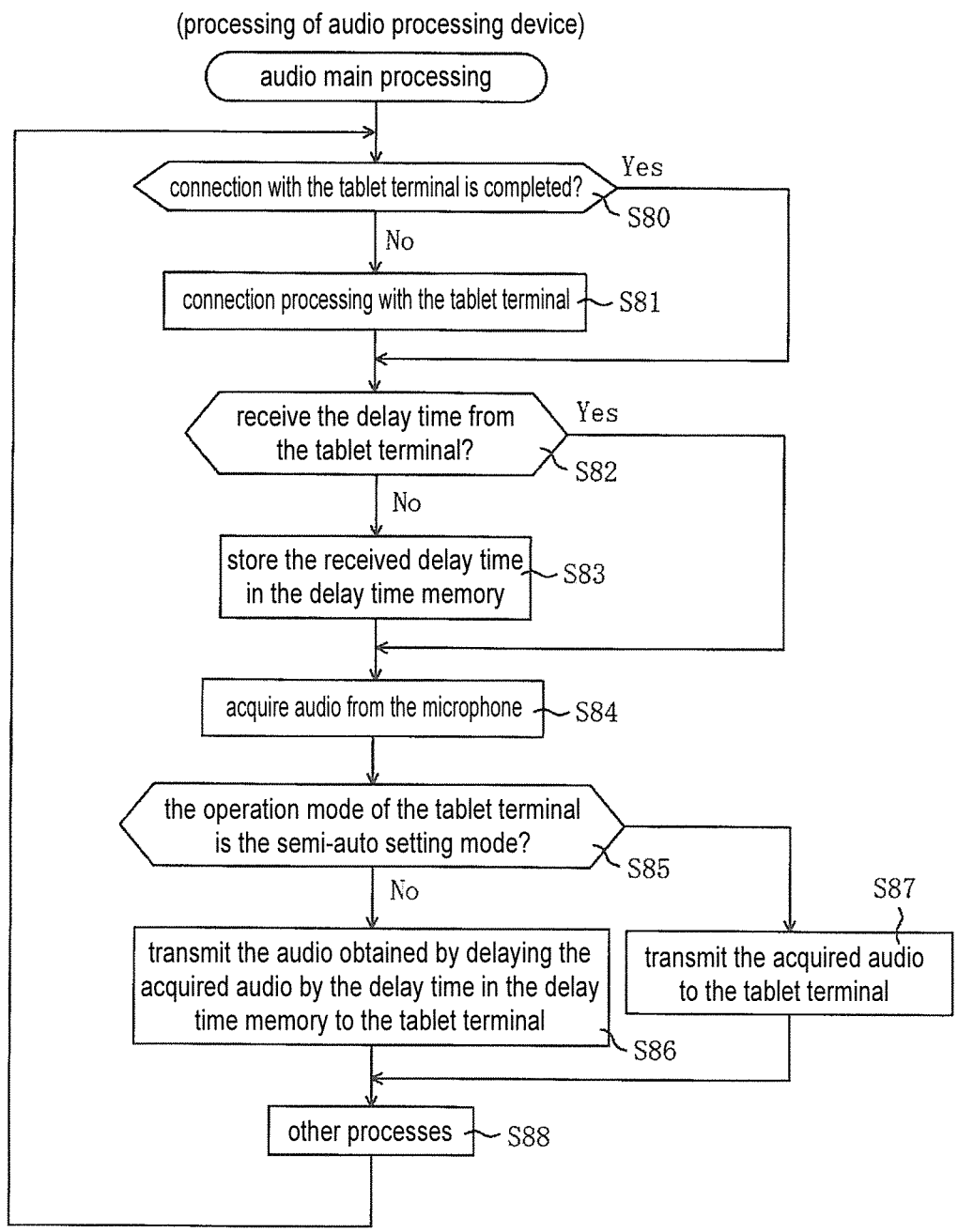
FIG. 10 is a flowchart of the audio main processing.

The CPU 10 is an arithmetic device that controls each part connected by the bus line 13. The flash ROM 11 is a rewritable nonvolatile storage device that stores programs to be executed by the CPU 10, fixed value data, etc., and includes a control program 11a. When the control program 11a is executed by the CPU 10, audio main processing, which will be described later with reference to FIG. 10, is executed.

The RAM 12 is a volatile memory for rewritably storing various work data, flags, etc. when the CPU 10 executes the programs, and includes a delay time memory 12a in which the delay time is stored.

The input/output terminal 16 is a terminal for connecting with the tablet terminal 30. In this embodiment, the input/output terminal 16 is configured based on the USB (registered trademark) standard, but may be based on communication standards other than USB.

The tablet terminal 30 has the CPU 31, a flash ROM 32, and a RAM 33, which are connected to an input/output port 35 via a bus line 34, respectively. The input/output port 35 is further connected with the input/output terminal 36, the wireless communication device 37, an LCD 38 on which the video acquired from the mobile terminal 70 is displayed, a touch panel 39 to which an instruction from the user H is input, and a video output device 40.

Figure 8:
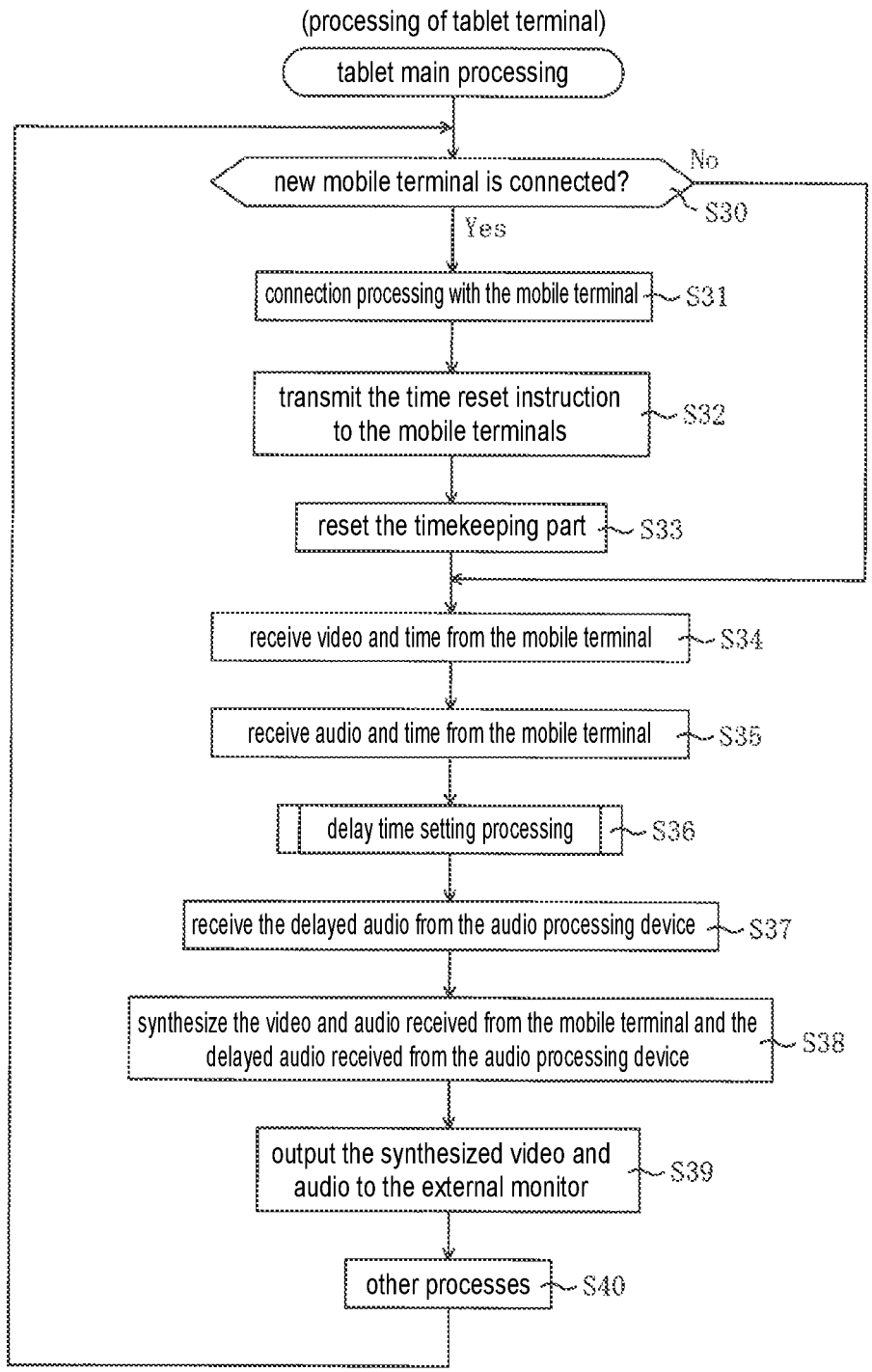
FIG. 8 is a flowchart of the tablet main processing.

The CPU 31 is an arithmetic device that controls each part connected by the bus line 34. The flash ROM 32 is a rewritable nonvolatile storage device that stores programs to be executed by the CPU 31, fixed value data, etc., and includes a control program 32a. When the control program 32a is executed by the CPU 31, tablet main processing of FIG. 8 is executed.

The RAM 33 is a volatile memory for rewritably storing various work data, flags, etc. when the CPU 31 executes the programs, and includes a delay time memory 33a in which the delay time is stored.

The input/output terminal 36 is a terminal for connecting with the audio processing device 1. In this embodiment, the input/output terminal 36 is configured based on the USB standard, but may be based on another communication standard as long as the communication standard allows communication with the input/output terminal 16 described above. The wireless communication device 37 is a device for wireless communication. The wireless communication device 37 is wirelessly connected to the AP 50 and wirelessly connected to the mobile terminal 70 via the AP 50.

The video output device 40 is a device that outputs the video and audio created by the tablet terminal 30. The video output device 40 is connected to the external monitor 200, and the video and audio created by the tablet terminal 30 are output to the external monitor 200 via the video output device 40.

Figure 6:
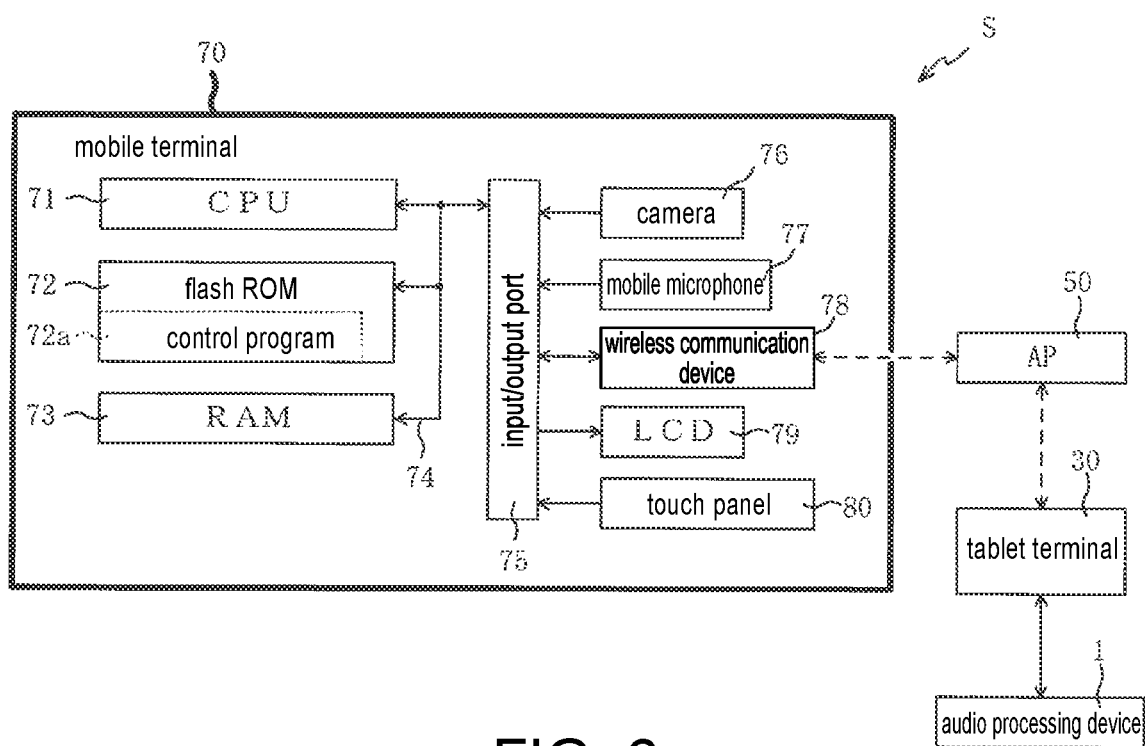
FIG. 6 is a block diagram showing an electrical configuration of the mobile terminal in the video processing system.

FIG. 6 is a block diagram showing an electrical configuration of the mobile terminal 70 in the video processing system S. The mobile terminal 70 has the CPU 71, a flash ROM 72, and a RAM 73, which are connected to an input/output port 75 via a bus line 74, respectively. The input/output port 75 is further connected with the mobile camera 76 and the mobile microphone 77 described above, the wireless communication device 78, an LCD 79 on which the video captured by the mobile camera 76 is displayed, and a touch panel 80 to which an instruction from the user H is input.

Figure 7:
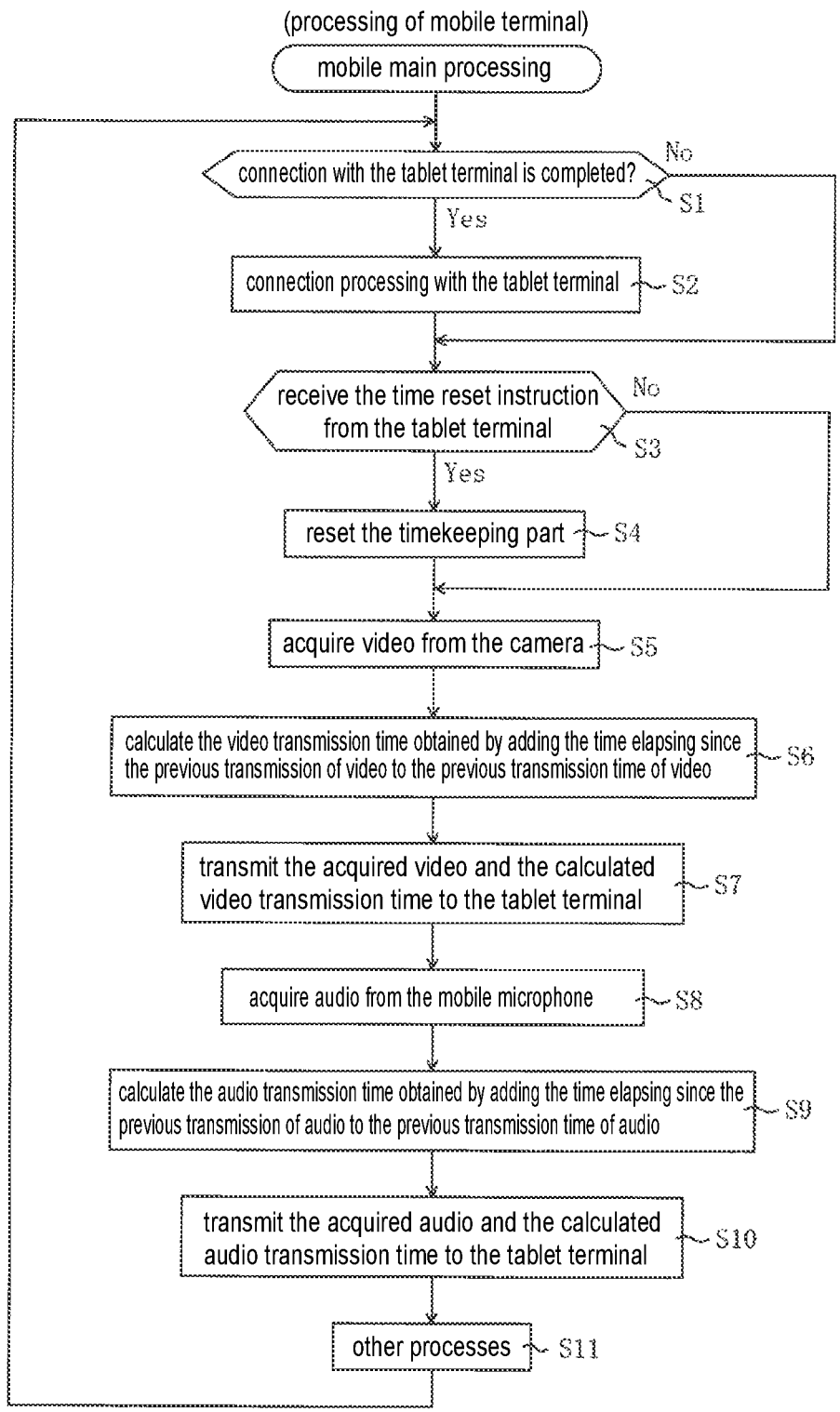
FIG. 7 is a flowchart of the mobile main processing.

The CPU 71 is an arithmetic device that controls each part connected by the bus line 74. The flash ROM 72 is a rewritable nonvolatile storage device that stores programs to be executed by the CPU 71, fixed value data, etc., and includes a control program 72a. When the control program 72a is executed by the CPU 71, mobile main processing of FIG. 7 is executed.

The RAM 73 is a volatile memory for rewritably storing various work data, flags, etc. when the CPU 71 executes the programs. The wireless communication device 78 is a device for wireless communication. The wireless communication device 78 is wirelessly connected to the AP 50 and wirelessly connected to the tablet terminal 30 via the AP 50.

Next, the processing executed by the CPU 10 of the audio processing device 1, the CPU 31 of the tablet terminal 30, and the CPU 10 of the audio processing device 1 will be described with reference to FIG. 7 to FIG. 10. First, the processing of the mobile terminal 70 will be described with reference to FIG. 7. FIG. 7 is a flowchart of the mobile main processing. The mobile main processing is the processing executed when an application program for the video processing system S included in the control program 72a of the mobile terminal 70 is started.

In the mobile main processing, first, it is confirmed whether the connection with the tablet terminal 30 is already completed (S1). In the process of S1, if the tablet terminal 30 is not connected (S1: No), the connection processing with the tablet terminal 30 is executed (S2). On the other hand, in the process of S1, if the tablet terminal 30 is already connected (S1: Yes), the process of S2 is skipped.

After the processes of S1 and S2, it is confirmed whether the time reset instruction described above is received from the tablet terminal 30 (S3). In the process of S3, if the time reset instruction is received (S3: Yes), the time of the timekeeping part built in the mobile terminal 70 itself is reset (S4). On the other hand, in the process of S3, if the time reset instruction is not received (S3: No), the process of S4 is skipped.

After the processes of S3 and S4, video is acquired from the mobile camera 76 (S5). In this embodiment, one frame of video is acquired from the mobile camera 76 in the process of S5, but video of a predetermined length (for example, one second) may be acquired collectively. After the process of S5, the time obtained by adding the time elapsing since the previous process of S7 to the time at which the video is transmitted by the previous process of S7, that is, the video transmission time described above with reference to FIG. 2A and FIG. 2B, is calculated (S6). In the process of S6, the current time may be acquired as the video transmission time.

After the process of S6, the video acquired by the process of S5 and the video transmission time calculated by the process of S6 are transmitted to the tablet terminal 30 (S7).

After the process of S7, audio is acquired from the mobile microphone 77 (S8). In this embodiment, one frame of audio is acquired from the mobile microphone in the process of S5, but audio of a predetermined length (for example, one second) may be acquired collectively. After the process of S8, the time obtained by adding the time elapsing since the previous process of S10 to the time at which the audio is transmitted by the previous process of S10, that is, the audio transmission time described above with reference to FIG. 2A and FIG. 2B, is calculated (S9). In the process of S9, the current time may be acquired as the audio transmission time.

After the process of S9, the audio acquired in the process of S8 and the audio transmission time calculated in the process of S9 are transmitted to the tablet terminal 30 (S10). After the process of S10, other processes of the mobile terminal 70 are executed (S11), and the processes from S1 onward are repeated.

Next, the processing of the tablet terminal 30 will be described with reference to FIG. 8 and FIG. 9. FIG. 8 is a flowchart of the tablet main processing. The tablet main processing is the processing executed when an application program for the video processing system S included in the control program 32a of the tablet terminal 30 is started.

In the tablet main processing, first, it is confirmed whether a new mobile terminal 70 is wirelessly connected (S30). In the process of S30, if a new mobile terminal 70 is wirelessly connected (S30: Yes), the connection processing with the new mobile terminal 70 is executed (S31). After the process of S31, the time reset instruction is transmitted to all the mobile terminals 70 connected (S32), and the time of the timekeeping part built in the tablet terminal 30 itself is reset (S33). On the other hand, in the process of S30, if no new mobile terminal 70 is wirelessly connected (S30: No), the processes of S31 to S33 are skipped.

After the processes of S30 and S33, the video and the video transmission time are received from the mobile terminal 70 (S34), and the audio and the audio transmission time are received from the mobile terminal 70 (S35). After the process of S35, the delay time setting processing (S36) is executed. The video and the audio are processed between the processes of S35 and S36. Here, the delay time setting processing will be described with reference to FIG. 9.

Figure 9:
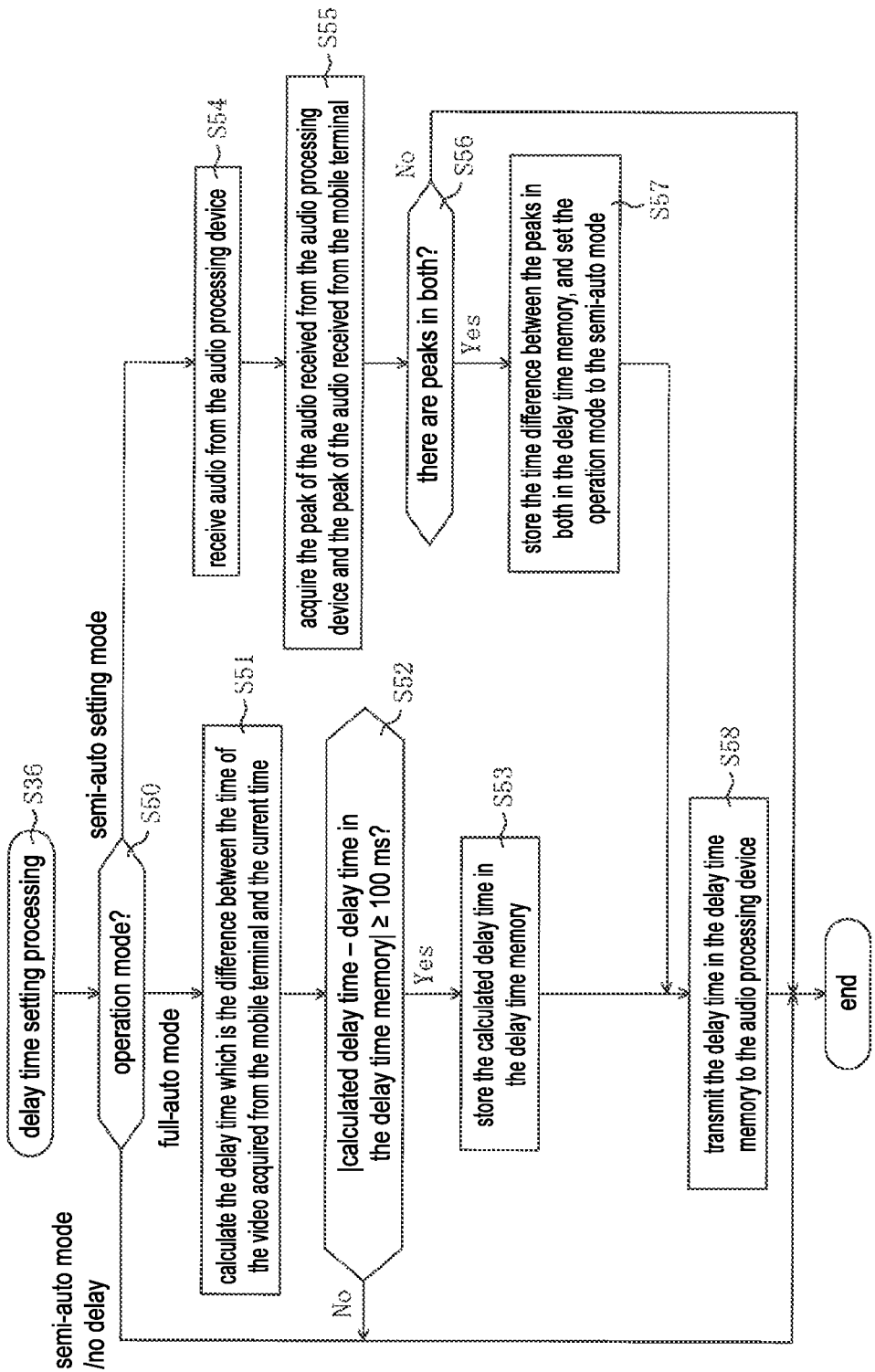
FIG. 9 is a flowchart of the delay time setting processing.

FIG. 9 is a flowchart of the delay time setting processing. In the delay time setting processing, it is assumed that the video transmission time and audio transmitted from the mobile terminal 70 with the identifier having the lowest value, among the plurality of mobile terminals 70 connected to the tablet terminal 30 described above, are used.

In the delay time setting processing, first, the operation mode regarding delay time setting is confirmed (S50). In this embodiment, the operation mode includes: the "full-auto mode" described above, a "semi-auto setting mode" for setting the delay time in the semi-auto mode, and the semi-auto mode and "no delay" which does not delay the audio due to the delay time.

The user H selects one of "full-auto mode/semi-auto mode/no delay" on the touch panel 39 of the tablet terminal 30. Alternatively, when the user H selects one of "full-auto mode/semi-auto mode/no delay" with the setting key 15 of the audio processing device 1, a control signal is sent to the tablet terminal 30 and these are selected by the tablet terminal 30.

When the semi-auto mode is selected, the operation mode is set to the semi-auto setting mode. When the delay time is calculated in the semi-auto setting mode, the semi-auto setting mode ends and the operation mode is set to the semi-auto mode. In addition, when no delay is selected, "0" is transmitted to the audio processing device 1 as the delay time. In this case, the value of the delay time memory 33a does not change.

In the process of S50, if the operation mode is the full-auto mode (S50: "full-auto mode"), the time difference between the video transmission time received in S34 of FIG. 8 and the current time, that is, the video processing completion time at which the processing of the received video is completed, that is, the delay time in the full-auto mode described above, is calculated (S51).

After the process of S51, it is confirmed whether the absolute value of the difference between the delay time calculated in the process of S51 and the delay time in the delay time memory 33a is 100 ms or more (S52). In the process of S52, if the absolute value of the difference between the delay time calculated in the process of S51 and the delay time in the delay time memory 33a is 100 ms or more (S52: Yes), the delay time calculated in the process of S51 is stored in the delay time memory 33a (S53).

That is, the delay time memory 33a is updated only when a delay time different from the delay time stored in the delay time memory 33a by 100 ms or more is calculated. Accordingly, the timing at which the audio of the audio processing device 1, which is delayed by the delay time, is emitted can be suppressed from frequently advancing or delaying. Therefore, it is possible to reduce the viewer's sense of incongruity with respect to the audio.

In the process of S50, if the operation mode is the semi-auto setting mode (S50: "semi-auto setting mode"), the audio is received from the audio processing device 1 (S54). The audio received from the audio processing device 1 in the process of S54 is not delayed audio due to the delay time, and is the audio acquired from the microphone 100 and transmitted to the tablet terminal 30 without being delayed. In addition, an instruction for setting the delay time to 0 may be transmitted to the audio processing device 1 in advance before executing the process of S54.

After the process of S54, the peaks of the waveform data of the audio received in the process of S54 and the waveform data of the audio received in the process of S35 of FIG. 8 are acquired (S55). The acquisition of the peaks from the waveform data is performed by known techniques. After the process of S55, it is confirmed whether there are peaks in both the waveform data of the audio received in the process of S54 and the waveform data of the audio received in the process of S35 of FIG. 8 (S56).

In the process of S56, if there are peaks in both the waveform data (S56: Yes), the time difference between the times at which the peaks are respectively reached, that is, the delay time in the semi-auto mode described above, is stored in the delay time memory 33a, and the operation mode is set to the semi-auto mode (S57).

After the processes of S53 and S57, the delay time in the delay time memory 33a is transmitted to the audio processing device 1 (S58). In the process of S58, the delay time in the delay time memory 33a is included in a MIDI (musical instrument digital interface) message and transmitted, but the delay time may be included in a message of a standard other than MIDI and transmitted.

The delay time setting processing is terminated if the operation mode is the semi-auto mode or no delay (S50: "semi-auto mode/no delay") in the process of S50, if the absolute value of the difference between the delay time calculated in the process of S51 and the delay time in the delay time memory 33a is smaller than 100 ms (S52: No) in the process of S52, if there is no peak in both the waveform data (S56: No) in the process of S56, or after the process of S58.

The processing returns to FIG. 8. After the delay time setting processing of S36, the delayed audio is received from the audio processing device 1 (S37). After the process of S37, new video and audio are created by synthesizing the video received in the process of S34, the audio received in the process of S35, and the delayed audio received in the process of S38 (S38). After the process of S38, the video and audio synthesized in the process of S38 are output to the external monitor 200 via the video output device 40 (S39). Accordingly, the video and audio created by the tablet terminal 30 are output on the external monitor 200.

After the process of S39, other processes of the tablet terminal 30 are executed (S40), and the processes from S30 onward are repeated.

Finally, the processing of the audio processing device 1 will be described with reference to FIG. 10. FIG. 10 is a flowchart of the audio main processing. The audio main processing is the processing executed when the power of the audio processing device 1 is turned on.

In the audio main processing, first, it is confirmed whether the connection with the tablet terminal 30 is already completed (S80). In the process of S80, if the tablet terminal 30 is not connected (S80: No), the connection processing with the tablet terminal 30 is executed (S81). On the other hand, in the process of S80, if the tablet terminal 30 is already connected (S80: Yes), the process of S81 is skipped.

After the processes of S80 and S81, it is confirmed whether the delay time is received from the tablet terminal 30 (S82). If the delay time is received from the tablet terminal 30 in the process of S82 (S82: Yes), the received delay time is stored in the delay time memory 12a (S83). On the other hand, if the delay time is not received from the tablet terminal 30 in the process of S82 (S82: No), the process of S83 is skipped.

After the processes of S82 and S83, the audio is acquired from the microphone 100 (S84). After the process of S84, it is confirmed whether the operation mode of the tablet terminal 30 is the semi-auto setting mode (S85). In addition, in the process of S85, the audio processing device 1 does not necessarily confirm the operation mode of the tablet terminal 30 each time, and the operation mode may be transmitted to the audio processing device 1 each time the operation mode of the tablet terminal 30 changes, and the operation mode may be stored in the audio processing device 1.

In the process of S85, if the operation mode of the tablet terminal 30 is not the semi-auto setting mode (S85: No), the delayed audio obtained by delaying the audio acquired in the process of S84 by the delay time in the delay time memory 12a is transmitted to the tablet terminal 30 (S86). On the other hand, in the process of S85, if the operation mode of the tablet terminal 30 is the semi-auto setting mode (S85: Yes), the audio acquired in the process of S84 is directly transmitted to the tablet terminal 30 (S87). The audio transmitted in the process of S87 is received in the process of S54 in FIG. 9 described above.

After the processes of S86 and S87, other processes of the audio processing device 1 are executed (S88), and the processes from S80 onward are repeated.

Although the disclosure has been described based on the above embodiment, it can be easily inferred that various improvements and modifications are possible.

In the above embodiment, in the full-auto mode, the delay time is the time difference between the video transmission time received from the mobile terminal 70 and the video processing completion time in the tablet terminal 30, but the disclosure is not limited thereto. The time difference between the audio transmission time received from the mobile terminal 70 and the video processing completion time in the tablet terminal 30 may be used as the delay time, the time difference between the audio transmission time received from the mobile terminal 70 and the audio processing completion time in the tablet terminal 30 may be used as the delay time, or the time difference between the video transmission time received from the mobile terminal 70 and the audio processing completion time in the tablet terminal 30 may be used as the delay time.

Further, in the above calculation of the delay time, instead of the video processing completion time, the video reception completion time which is the time at which the tablet terminal 30 completes receiving the video may be used, or the audio reception completion time which is the time at which the tablet terminal 30 completes receiving the audio may be used.

In the above embodiment, the delay time set in the full-auto mode or the semi-auto mode is used to delay the audio acquired by the audio processing device 1, but the disclosure is not limited thereto. For example, the delay time set by the setting key 15 may be used to delay the audio acquired by the audio processing device 1. In addition, a delay time obtained by adding or subtracting the delay time set by the setting key 15 to or from the delay time set in the full-auto mode or the semi-auto mode may be used to delay the audio acquired by the audio processing device 1.

Further, when the user H selects the semi-auto mode, the operation mode is set to the semi-auto setting mode, and when the delay time is calculated, the operation mode is set to the semi-auto mode, but the disclosure is not limited thereto. For example, when operating in the semi-auto mode, the calculation of the delay time using a specific sound may be continued in the same manner as in the semi-auto setting mode.

Furthermore, in the full-auto mode, along with the calculation of the delay time based on the video processing completion time and the video transmission time, the calculation of the delay time using a specific sound may be performed as in the semi-auto setting mode. In this case, the average value of the delay time based on the video processing completion time and the video transmission time and the delay time using a specific sound as in the semi-auto setting mode may be used as the delay time actually used, or one of the delay time based on the video processing completion time and the video transmission time and the delay time using a specific sound as in the semi-auto setting mode, whichever is closer to the current delay time (that is, the delay time stored in the delay time memory 33a), may be used as the delay time actually used.

In the above embodiment, the delay time is calculated by the tablet terminal 30 and transmitted to the audio processing device 1, but the disclosure is not limited thereto. For example, the delay time may be calculated by the audio processing device 1. In this case, in the full-auto mode, the tablet terminal 30 may transmit the video transmission time and the video processing completion time to the audio processing device 1. Further, in the semi-auto mode, the audio of the mobile terminal 70 received by the tablet terminal 30 may be transmitted to the audio processing device 1.

In the above embodiment, in the semi-auto mode, the handclap sound is exemplified as the specific sound, but the disclosure is not limited thereto. Other characteristic sounds such as the voice uttered by the user H, the tone of a musical instrument, and a buzzer sound, may be used. Further, the delay time is not necessarily calculated based on the peak of the specific sound. For example, the specific sound may contain a unique frequency, and the delay time may be calculated based on the timing at which the unique frequency is observed in the audio acquired by the audio processing device 1 and the audio acquired by the mobile terminal 70.

Further, in the above embodiment, the delay of the acquired audio is processed in the audio processing device 1, but the disclosure is not limited thereto. For example, the tablet terminal 30 may perform the processing for the delay of the audio. In this case, the audio processing device 1 may transmit the audio acquired from the microphone 100 to the tablet terminal 30, and the tablet terminal 30 may create the delayed audio by delaying the audio received from the audio processing device 1 by the calculated delay time.

In the above embodiment, the mobile terminal 70 to which the video transmission time used for calculating the delay time is transmitted is selected based on the identifier of the mobile terminal 70, but the disclosure is not limited thereto. For example, the mobile terminal 70 that is connected to the tablet terminal 30 the earliest may be selected. In addition, the mobile terminal 70 that has acquired the video used for synthesis in the process of S38 in FIG. 8 may be selected, or the mobile terminal 70 that has acquired the video showing a person or a musical instrument may be selected.

In addition, the average value of the video transmission times acquired from a plurality of mobile terminals 70 may be used as the video transmission time used for calculating the delay time. At this time, extremely small or large video transmission times may be excluded from the video transmission time for calculating the average value. Alternatively, the median value, the minimum value, or the maximum value of the video transmission times acquired from a plurality of mobile terminals 70 may be used as the video transmission time used for calculating the delay time.

In the above embodiment, the audio processing device 1 and the tablet terminal 30 are connected by wire, but the disclosure is not limited thereto. The audio processing device 1 and the tablet terminal 30 may be wirelessly connected. Moreover, the tablet terminal 30 and the mobile terminal 70 are wirelessly connected, but the disclosure is not limited thereto. The tablet terminal 30 and the mobile terminal 70 may be connected by wire.

In the above embodiment, the video processing system S is configured with the mobile terminals 70, the tablet terminal 30, and the audio processing device 1, but the disclosure is not limited thereto. For example, by connecting the microphone 100 to the tablet terminal 30 and implementing the functions of the audio processing device 1 on the tablet terminal 30, the video processing system S may be configured with the mobile terminal and the tablet terminal 30. In this case, the tablet terminal 30 that also has the functions of the audio processing device 1 is referred to as the "video processing apparatus."

In the above embodiment, the mobile terminal 70 is exemplified as the video output device that acquires video, but the disclosure is not limited thereto. Instead of the mobile terminal 70, a device such as a video camera that can acquire video may be used.

In the above embodiment, the tablet terminal 30 is exemplified as the video processing apparatus that processes video, but the disclosure is not limited thereto. For example, a personal computer or a mobile terminal may be used as the video processing apparatus.

In the above embodiment, in the video output device, the imaging part is realized by the process of S5, the video transmission part is realized by the process of S7, the transmission time acquisition part is realized by the process of S6, and the video transmission time transmission part is realized by the process of S7.

In the above embodiment, in the video processing apparatus, the video reception part is realized by the process of S34, the video transmission time reception part is realized by the process of S34, the video processing part is realized by processing video and audio between the process of S35 and S36, the video processing completion time acquisition part is realized by the process of S51, the delay time calculation part realized by the process of S51, the delay time transmission part is realized by the process of S58, the delayed audio reception part is realized by the process of S37, and the output part is realized by the process of S39.

In the above embodiment, in the audio processing device, the audio acquisition part is realized by the process of S84, the delay time reception part is realized by the process of S82, the delayed audio creation part is realized by the process of S86, and the delayed audio transmission part is realized by the process of S86.

The content acquisition part, the usage part, the prohibition part, the temporary storage part, the content storage part, the utilization part, the purchase status acquisition part, the content saving part, the re-acquisition prohibition part, and the list display part are realized by execution of the control program 32*a* performed by the CPU 31 of FIG. 3 and FIG. 8. However, at least some of these may be realized by hardware such as an electronic circuit (for example, FPGA or dedicated LSI).

The numerical values given in the above embodiment are examples, and it is naturally possible to adopt other numerical values.

What is claimed is:
1. A video processing apparatus, comprising:
an audio acquisition part acquiring audio from an audio input device connected;
a video reception part receiving video from a video output device;
a video transmission time reception part receiving, from the video output device, a video transmission time, which is a time at which the video received by the video reception part is transmitted from the video output device;
a video processing part processing the video received by the video reception part;
a video processing completion time acquisition part acquiring a video processing completion time, which is a time at which processing performed by the video processing part is completed;
a delay time calculation part calculating a delay time, which is a time difference between the video processing completion time acquired by the video processing completion time acquisition part and the video transmission time received by the video transmission time reception part;
a delayed audio creation part creating delayed audio obtained by delaying the audio acquired by the audio acquisition part by the delay time calculated by the delay time calculation part; and an output part outputting the video processed by the video processing part and the delayed audio created by the delayed audio creation part.

2. The video processing apparatus according to claim 1, comprising:
an audio reception part receiving audio from the video output device,
wherein the output part outputs the video processed by the video processing part, the audio received from the video output device, and the delayed audio created by the delayed audio creation part.

3. The video processing apparatus according to claim 1, comprising:
an audio reception part receiving audio from the video output device; and
an audio transmission time reception part receiving, from the video output device, an audio transmission time, which is a time at which the audio received by the audio reception part is transmitted from the video output device,
wherein the delay time calculation part calculates, as the delay time, a time difference between the video processing completion time acquired by the video processing completion time acquisition part and the audio transmission time received by the audio transmission time reception part.

4. The video processing apparatus according to claim 1, wherein the video reception part receives video respectively from a plurality of the video output devices,
the video transmission time reception part receives the video transmission time from one of the video output devices,
the video processing part respectively processes the video from the video output devices received by the video reception part, and
the video processing completion time acquisition part acquires the video processing completion time of processing of the video received from the one video output device which receives the video transmission time by the video transmission time reception part.

5. The video processing apparatus according to claim 1, wherein the video output devices and the video processing apparatus are connected by wireless communication.

6. The video processing apparatus according to claim 5, wherein the video output devices are respectively connected to the same access point of the wireless communication.

7. A video processing apparatus, comprising:
a video reception part receiving video from a video output device;
a video transmission time reception part receiving a video transmission time from the video output device;
a video processing part processing the video received by the video reception part;
a video processing completion time acquisition part acquiring a video processing completion time, which is a time at which processing performed by the video processing part is completed;
a delay time calculation part calculating a delay time, which is a time difference between the video processing completion time acquired by the video processing completion time acquisition part and the video transmission time received by the video transmission time reception part;
a delay time transmission part transmitting the delay time calculated by the delay time calculation part to an audio processing device;

an audio reception part receiving audio from the audio processing device; and
an output part outputting the video processed by the video processing part and the audio received by the audio reception part.

8. The video processing apparatus according to claim 7, wherein the audio reception part receives audio from the video output device, and
the video processing apparatus further comprises:
an audio transmission time reception part receiving, from the video output device, an audio transmission time, which is a time at which the audio received by the audio reception part is transmitted from the video output device,
wherein the delay time calculation part calculates, as the delay time, a time difference between the video processing completion time acquired by the video processing completion time acquisition part and the audio transmission time received by the audio transmission time reception part.

9. A video processing system, comprising a video output device, a video processing apparatus, and an audio processing device,
wherein the video output device comprises:
an imaging part capturing video;
a video transmission part transmitting the video captured by the imaging part to the video processing apparatus;
a transmission time acquisition part acquiring a video transmission time, which is a time at which the video is transmitted by the video transmission part; and
a video transmission time transmission part transmitting the video transmission time acquired by the transmission time acquisition part to the video processing apparatus,
wherein the video processing apparatus comprises:
a video reception part receiving the video from the video output device;
a video transmission time reception part receiving the video transmission time from the video output device;
a video processing part processing the video received by the video reception part;
a video processing completion time acquisition part acquiring a video processing completion time, which is a time at which processing performed by the video processing part is completed;
a delay time calculation part calculating a delay time, which is a time difference between the video processing completion time acquired by the video processing completion time acquisition part and the video transmission time received by the video transmission time reception part;
a delay time transmission part transmitting the delay time calculated by the delay time calculation part to the audio processing device;
a delayed audio reception part receiving delayed audio from the audio processing device; and
an output part outputting the video processed by the video processing part and the delayed audio received by the delayed audio reception part,
wherein the audio processing device comprises:
an audio acquisition part acquiring audio from an audio input device connected;
a delay time reception part receiving the delay time from the video processing apparatus;

a delayed audio creation part creating the delayed audio obtained by delaying the audio acquired by the audio acquisition part by the delay time received by the delay time reception part; and a delayed audio transmission part transmitting the delayed audio created by the delayed audio creation part to the video processing apparatus.

10. A video processing method, comprising:

acquiring audio;

receiving video from a video output device;

receiving a video transmission time, which is a time at which the video received is transmitted;

processing the video received;

acquiring a video processing completion time, which is a time at which processing is completed;

calculating a delay time, which is a time difference between the video processing completion time acquired and the video transmission time received;

creating delayed audio obtained by delaying the audio acquired by the delay time calculated; and outputting the video processed and the delayed audio created.

11. The video processing method according to claim 10, comprising:

receiving audio from the video output device, wherein the outputting is to output the video processed, the audio received, and the delayed audio created.

12. The video processing method according to claim 10, comprising:

receiving audio from the video output device; and receiving, from the video output device, an audio transmission time, which is a time at which the audio received is transmitted from the video output device, wherein calculating the delay time is to calculate, as the delay time, a time difference between the video processing completion time acquired and the audio transmission time received.

13. A video processing method, comprising:

receiving video from a video output device;

receiving a video transmission time, which is a time at which the video received is transmitted;

processing the video received;

acquiring a video processing completion time, which is a time at which processing is completed;

calculating a delay time, which is a time difference between the video processing completion time acquired and the video transmission time received;

transmitting the delay time calculated;

receiving audio; and outputting the video processed and the audio received.

14. The video processing method according to claim 13, comprising:

receiving audio from the video output device; and receiving, from the video output device, an audio transmission time, which is a time at which the audio received is transmitted from the video output device, wherein calculating the delay time is to calculate, as the delay time, a time difference between the video processing completion time acquired and the audio transmission time received.

* * * * *